0-382. SR
-28-75 XR FE28319

Jan. 28, 1975 W. J. KERR Re. 28,319

AXIAL PIN TUMBLER LOCK ASSEMBLY AND COMBINATION RESET KEY THEREFOR

Original Filed Aug. 19, 1971 2 Sheets-Sheet 1

INVENTOR.
WILLIAM J. KERR
BY Norman Stenzel
Atty.

INVENTOR.
WILLIAM J. KERR
BY Norman P. Brown
Atty.

United States Patent Office

Re. 28,319
Reissued Jan. 28, 1975

28,319

AXIAL PIN TUMBLER LOCK ASSEMBLY AND COMBINATION RESET KEY THEREFOR

William J. Kerr, Madison, Wis., assignor to Chicago Lock Co., Chicago, Ill.

Original No. 3,756,049, dated Sept. 4, 1973, Ser. No. 172,991, Aug. 19, 1971. Application for reissue July 10, 1974, Ser. No. 487,052

Int. Cl. E05b *25/00, 29/00*

U.S. Cl. 70—363 3 Claims

Matter enclosed in heavy brackets [ ] appears in the original patent but forms no part of this reissue specification; matter printed in italics indicates the additions made by reissue.

ABSTRACT OF THE DISCLOSURE

An axial tumbler lock assembly having a three-part cylinder arrangement including a fixed rear part, a rotatable front part, and a rotatable intermediate part, the three parts establishing between them two interfacial planes. Three-piece split tumbler arrangements are slidable in aligned bores in the cylinder parts and normally project across both interfacial planes to thus prevent relative turning of either rotatable cylinder part with respect to the fixed cylinder part. A reset key is provided for releasing the front cylinder part from the intermediate cylinder part without releasing the intermediate cylinder part, thus effecting a new alignment of tumbler pieces and a combination change so that a different operating key is required for each combination change of which the lock is capable. The reset key is incapable of effecting unlocking operations.

The improved axial pin tumbler lock assembly comprising the present invention is primarily designed for use in connection with the door of a vending machine cabinet where managerial policy dictates that the pin tumbler combinations of the lock assembly shall be changed frequently, usually on the order of at least once each week. The invention is, however, capable of other uses, and lock assemblies embodying the principles of the present invention may find wide application in other fields as, for example, in connection with parking meters, self-service gasoline dispensing pumps, safety deposit boxes and other lock applications too numerous to mention.

The invention is concerned primarily with a lock assembly of the axial pin tumbler type wherein the split tumblers that are associated therewith are circumferentially spaced about and extend parallel to the central longitudinal axis of the lock barrel, are spring-biased or pressed towards the front end of the lock barrel, and are designed for cooperation with a key having circumferentially spaced, tumbler-engaging shoulders which are adapted, when the key is inserted into said front end of the lock barrel, to engage the forward ends of the split tumblers and shift or depress said tumblers rearwards. This type of lock assembly is widely used in connection with vending machines which are installed in public places such as subway stations and the like.

Heretofore, the changing of the pin tumbler combination of such a lock assembly in the field has been hampered by the necessity of having first to open the door of the cabinet or other structure to which the lock assembly is applied and then to dismantle as much of the lock assembly as is necessary to render the split pin tumblers accessible for removal and subsequent substitution or replacement. The workman or operator who is assigned to such combination substitution work is obliged to carry with him various tools, as well as an assortment of lock parts including split pin tumblers of varying lengths. These pin tumblers must be cataloged so that the operator will know their successive order of replacement in the various lock assemblies and, therefore, an operator who is not only skilled from the point of view of workmanship, but one who also has the ability to perform a certain amount of bookkeeping work, must be employed. An additional limitation resides in the fact that when such an operator works from the back side of a cabinet door, the necessarily open door is frequently a hinderance to people passing by such as are encountered on a subway platform for example. Finally, it is necessary that a trustworthy operator be employed inasmuch as for all lock-changing operations that have heretofore been adopted for large-scale lock-changing operations, the interior of the cabinet has been accessible to the operator and invariably access to the cabinet means access to its contents including such money or other valuables as may have been deposited therein.

The present invention is designed to overcome the above noted inconveniences that are attendant upon the changing of pin tumbler combinations which are associated with axial pin tumbler locks and toward this end, it contemplates the provision of a novel lock assembly wherein the insertion of a special reset key into the circular key-receiving opening in the front end of the lock barrel and subsequent turning of such key throughout a predetermined angle will automatically effect changing of the pin tumbler combination so that after the reset key is withdrawn from the key-receiving opening, the original key which formerly fitted the lock assembly will no longer work and a different regular key will be required to actuate the lock assembly.

An important feature of the present invention resides in the fact that the special reset key does not have the ability to effect unlocking operations, the lock assembly remaining in its locked condition during combination changeover operations and the only key to which the lock will respond is a key which has been cut according to the combination which is brought about by use of the special reset key.

Stated otherwise, the function of the special reset key is entirely a resetting function and its use is accomplished simply by inserting the same in the circular key-receiving opening in the front end of the barrel of the lock assembly and turning the same throughout a calculated or predetermined angle in order thereby to effect within the lock barrel certain tumbler shifting movements by means of which the existing combination of pin tumblers will be destroyed and a new combination will be supplied. In using the reset key, it is not necessary that the cabinet or other structure to which the lock assembly is applied be opened, nor in fact is it possible for the reset operator to open such cabinet unless he is specifically supplied with an operating key which is cut for the combination that is to be changed or for the new combination. Ordinarily, where vending machines are concerned, the reset operator will not be supplied with an operating key of any sort, his only equipment being in the form of a single reset key. Neither is it necessary for the operator to remove any portion of the lock assembly and, in fact, it is not even necessary for the operator to handle or even touch the lock assembly, his only function being to insert the reset key into the circular key-receiving opening in the front end of the lock barrel, then turn the key to the desired combination change, then withdraw the reset key, and finally proceed to the next vending machine which is to be processed.

The provision of a lock assembly and a special reset key therefor such as has briefly been outlined above constitutes the principal object of the invention. Other objects and advantages of the invention not at this time enumerated will be apparent from a consideration of the following detailed description.

The invention consists in the several novel features which are hereinafter described and are more particularly defined by the claims at the conclusion hereof.

In the accompanying two sheets of drawings forming a part of this specification, one illustrative embodiment of the invention is shown.

Figure 8:
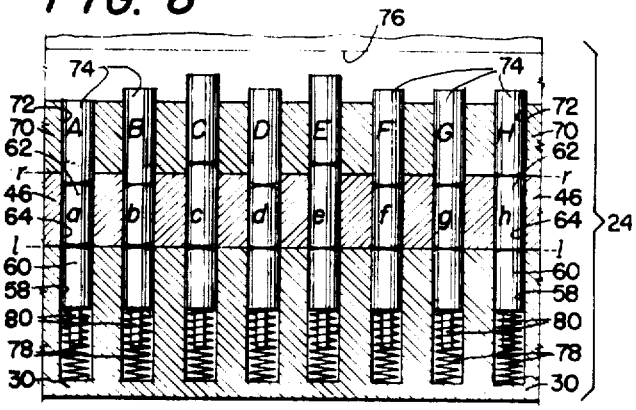
FIG. 8 is a homolographic view similar to FIG. 7 but representing the positions of the pin tumblers when a first and proper key is inserted into the front end of the barrel of the lock assembly but before the key is turned in a direction to effect unlocking of the lock assembly.
Figure 10:
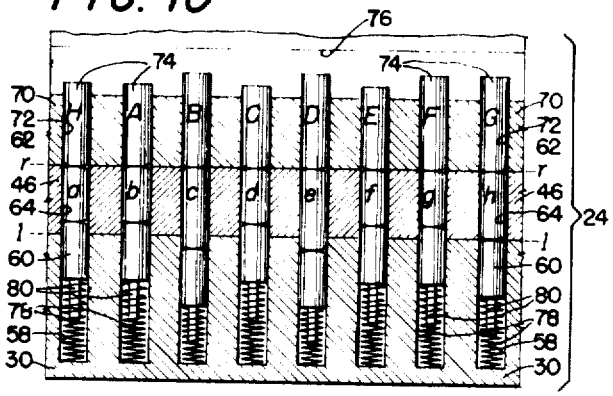
FIG. 10 is a homolographic view similar to FIG. 9 showing the position of the pin tumblers after the reset key has been turned to effect the combination change, but prior to withdrawal of such special reset key from the lock.
Figure 11:
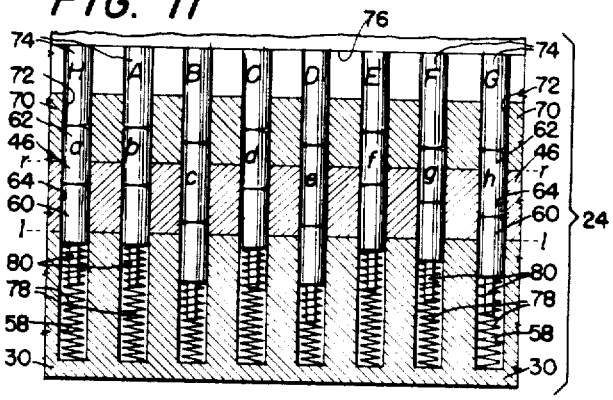
Figure 12:
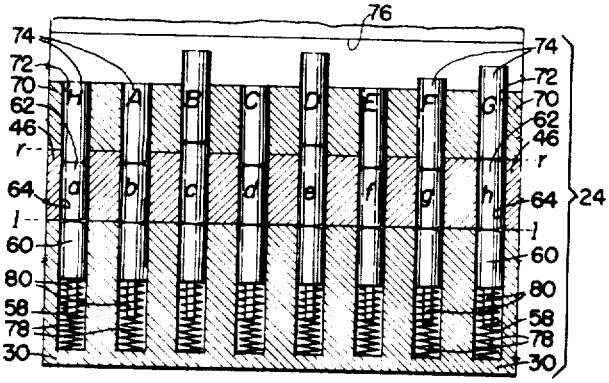

FIG. 11 is a homolographic view similar to FIG. 10 but showing the position of the pin tumblers after the reset key has been withdrawn and with the new combination of pin tumblers prevailing; and FIG. 12 is a homolographic view similar to FIG. 8 but showing the pin tumblers in the positions which they assume when a proper key conforming to the new combination has been inserted in the lock but prior to turning of such key to effect unlocking of the assembly.

Figure 5:
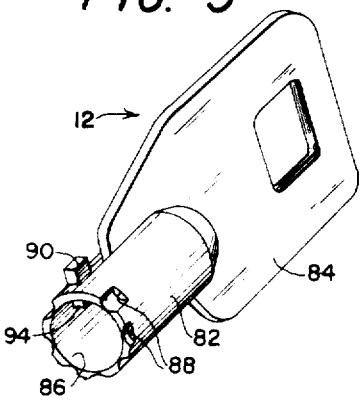
FIG. 5 is a perspective view of an operating key for the lock assembly of FIGS. 1 to 4, inclusive.
Figure 6:
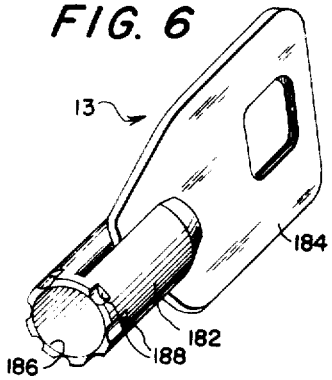
FIG. 6 is a perspective view of a reset key by means of which the pin tumbler combination of the lock assembly may be changed.

Referring now to the drawings in detail and in particular to FIGS. 1 to 4, inclusive, a preferred form of lock assembly which is constructed according to the present invention is designated in its entirely by the reference numeral 10. A key for operating the lock assembly to lock and unlock the same is shown in FIG. 5 and identified by the reference numeral 12. A reset key which is illustrated in FIG. 6 and is designated in its entirety by the reference numeral 13 is capable of operating the lock assembly 10 for the purpose of changing the pin tumbler combination thereof, but is incapable of either locking or unlocking the assembly. The lock assembly 10 is of the axial pin-tumbler type, which is to say that it is provided with an annular series of circumferentially spaced split pin tumbler arrangements including tumblers which extend in the axial direction of the lock barrel and are shiftable endwise upon engagement of the front reset tumblers of the split tumbler arrangements with outwardly facing tumbler-actuating shoulders on the operating key 12, as will be described presently.

The lock assembly 10 involves in its general organization a cylindrical outer tubular barrel 14, the forward end of which is formed with an outwardly turned radial rim flange 16. The barrel 14 is provided with an external screw thread 18 for reception thereover of a nut 20 which cooperates with the rim flange 16 in clamping the lock assembly in position on a cabinet door or the like (not shown). The screw thread 18 is interrupted by the provision of a pair of oppositely disposed flats 22 by means of which the barrel may be gripped by a suitable turning tool such as a wrench.

The barrel 14 of the lock assembly 10 serves to enclose a three-part lock cylinder arrangement, the details of which will be made clear subsequently, such arrangement being designated by the bracket 24 in the homolographs constituting FIGS. 7 to 12, inclusive. Said three-part lock cylinder arrangement includes a fixed rear part and two rotatable parts in front of the rear part. The fixed cylinder part is comprised of a lock cylinder proper 30 which is anchored to the barrel 14 by means of a radial pin 32, the cylinder proper thus being non-rotatable and forms the fixed rear part of the three-part lock cylinder arrangement 24. Rotatably disposed within the barrel 14 is an elongated, longitudinally extending lock shaft 34 embodying a rear cylindrical section 36 (see FIG. 2) which projects through and is coextensive with a central bore in the lock cylinder proper 30. A front cylindrical section 38 on the lock shaft 34 is formed with a rounded outer or front end 40 and this lies within the confines of a circular key-receiving opening 42 within an inwardly extending rim flange 44 at the front end of the barrel 14. This front cylindrical section 38 constitutes a key-centering post which, in connection with axial tumbler-type lock assemblies, is commonly referred to as a "centerpost." The lock shaft 34 is further provided with an intermediate cylindrical section 46 in the form of a radial lock shaft flange, the diameter of which is substantialy equal to the internal diameter of the barrel 14 and, consequently, to the outer diameter of the lock cylinder proper 30. The intermediate section 46 constitutes one of the two rotatable parts of the lock cylinder arrangement 24.

The rear end of the lock shaft 34 is provided with a short reduced extension 48 which projects through the usual washer 50 and is formed with a pair of diametrically opposite flats 52. The latter cooperate with a radically extending locking cam 54 which turns with the lock shaft 34 into and out of locking position as is well known in the art. A nut 56 is threadedly received on the outer extremity of the lock shaft extension 48 and serves to hold the locking cam in a clamped position against the washer 50.

The lock cylinder proper 30 is provided with an annular series of circumferentially spaced, axially extending cylindrical sockets 58, each of which slidably receives therein a non-rotative follower tumbler 60 of a three-piece split pin tumbler arrangement. The rear ends of the sockets 58 are closed and the front ends of the sockets are open. Each follower tumbler 60 is designed for cooperation with a rotative driver tumbler 62 which forms the intermediate piece of said three-piece tumbler arrangement and is slidably disposed in an axially extending bore 64 in the intermediate cylindrical section 46 of the lock shaft 34. The bores 64 are arranged in an annular series. They are open at both end and correspond in number to the sockets 58.

Figure 2:
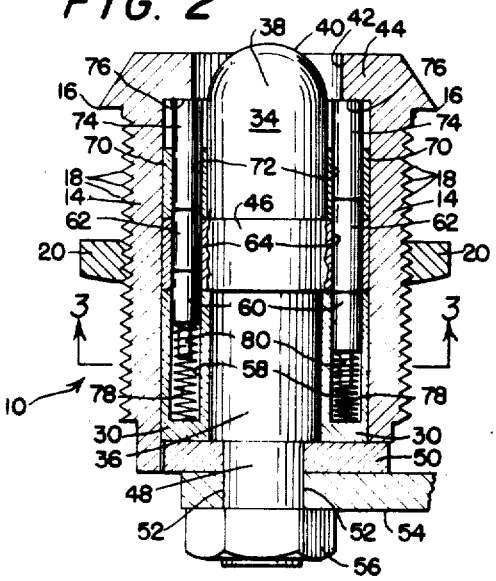
FIG. 2 is a longitudinal sectional view taken on the line 2—2 of FIG. 1.

A reset cylinder 70 which constitutes the other rotatable part of the three-part lock cylinder arrangement 24 is rotatable in the barrel 14 and is disposed on that side of the intermediate cylindrical section 46 of the lock shaft 34 that is remote from the lock cylinder proper 30. It has a central circular hole for receiving the front cylindrical section 38 of the lock shaft 34 and is provided with an annular series of bores 72. The latter correspond in number to the bores 64 in the intermediate cylindrical section 46 of the lock shaft 34 and are movable into and out of register with said bores 64. Each bore 72 slidably receives therein a reset tumbler 74 which forms the third and front piece of said three-part tumbler arrangement and, in effect, functions as an interchangeable extension for the associated driver tumbler 62. The reset tumblers 74 also function as driver tumblers themselves in that, when they are depressed by the reset key 23, they shift the positions of the driver tumblers 62 as well as the follower tumblers 60. The reset cylinder 70 and the reset tumblers 74 which are carried thereby constitute the principal feature of the present invention. The reset tumblers 74 normally bear forwardly against an annular shoulder 76 which is established by the inner face of the inwardly extending rim flange 44 on the front end of the barrel 14, these tumblers being yieldingly biased against said shoulder by means of an annular series of helical compression springs 78. The latter correspond in number to and are disposed respectively in the rear end of the sockets 58 in the lock cylinder proper 30. As best shown in FIG. 2, the springs are piloted on posts 80 which are formed on the rear ends of the follower tumblers 60. The compression in the springs 78 is transmitted through the driver tumblers 62 to the reset tumblers 74.

Figure 9:
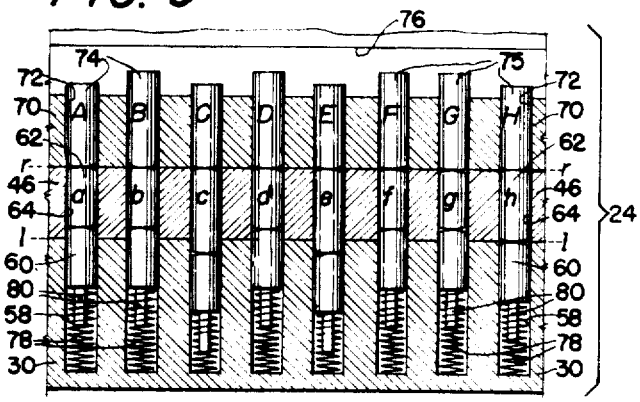
FIG. 9 is a homolographic view similar to FIG. 7 but showing the pin tumblers in the positions which they assume after the special reset key of FIG. 6 is inserted into the lock barrel but prior to turning of such key to effect a change of the tumbler combination.
Figure 3:
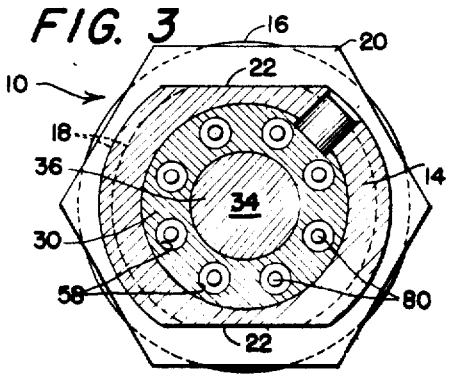
FIG. 3 is a transverse sectional view taken on the line 3—3 of FIG. 2.
Figure 4:
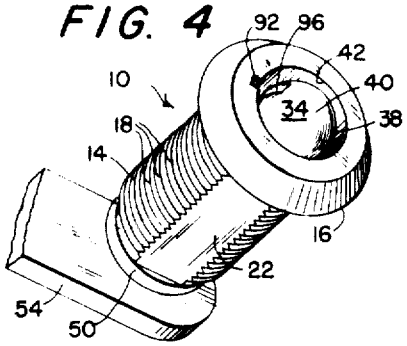
FIG. 4 is a fragmentary front perspective view of the lock assembly.

From the above description, it will be observed that the lock barrel 14 serves to enclose the three parts 30, 46 and 70 of the lock cylinder assembly 24 and that these three parts establish among themselves two interfacial planes which are designated, respectively, in FIGS. 7 to 12 by the broken lines r—r and l—l. The interfacial plane r—r will be referred to as the "reset" plane and the interfacial plane l—l will be referred to as the "locking" plane. The reset plane is established by the interface between the reset cylinder 70 and the intermediate cylinder section 46 of the lock shaft 34. The locking plane is established by the interface between the intermediate cylindrical section 46 and the lock cylinder proper 30. As a prelude to a proper understanding of the operation of the herein described lock assembly 10, it must be borne in mind that when all of the splits which exist between the driver tumblers 62 and the follower tumblers 60 lie in the interfacial plane l—l as shown in FIGS. 8 and 12, the lock shaft 34 which carries the rotatable intermediate cylindrical section 46 may be turned with respect to the fixed lock cylinder proper 30 and the barrel 14, thus effecting locking and unlocking operations in the usual manner of operation of an axial pin tumbler lock. When all of the splits which exist between the driver tumblers 62 and the reset tumblers 74 lie in the interfacial plane r—r as shown in FIGS. 9 and 10, the reset cylinder 70 is free to turn throughout an arc of 360° with respect to the intermediate cylindrical section 46 of the lockshaft 34. As shown in FIGS. 7 to 12 of the drawings, certain of the driver tumblers 62 are of different length and certain of the reset tumblers 74 are of different length. This is both important and necessary to proper workability of the present lock assembly. Also as shown in the drawings, the follower tumblers, the driver tumblers, and reset tumblers form three-part only tumbler arrangements.

Shifting of the various tumblers 60, 62 and 74 endwise either for lock operation or for lock resetting purposes may be effected by selective use of the operating key 12 and the reset key 13. These two keys are of similar construction, each of them being cut from a commercially available axial tumbler lock key. As shown in FIG. 5, the operating key 12 includes a cylindrical body portion 82, one end of which is notched in order fixedly to receive the usual manipulating wing 84. The body portion 82 of the regular operating key 12 is tubular to the end that it has a deep internal axial socket 86 which is designed for reception over the centerpost 38 (front cylindrical section of the lock shaft 34) in telescopic relationship when the key is initially introduced into the lock assembly through the circular key-receiving opening 42. The key 12 is provided with bitting which embodies an annular series of forwardly facing shoulders 88 which are cut to different depths in the outer periphery of the rim region of the body portion 82 of the operating key 12 and these shoulders are adapted to engage the extreme forward ends of the reset tumblers 74 for tumbler shifting purposes. In order to insure entry of the key 12 into the lock assembly 10 in the proper angular relationship so that alignment of the shoulders 88 with their respective reset tumblers will take place, an external alignment lug 90 is provided on the body portion 82 and is adapted to project into an inwardly facing notch 92 (see FIGS. 1 and 4) in the inwardly extending rim flange 44 of the barrel 14. After the alignment lug 90 has moved past the rim flange 44 and the key has been turned, the key will be constrained from being withdrawn from the lock assembly 10 until such time as the lug 90 is again restored or positioned to register with the notch 92. An internal lug 94 is provided on the rim portion of the key body 82 and is designed for cooperation with a longitudinally extending groove 96 which is formed in the centerpost 38 of the lock assembly 10.

The reset key 13, except for its bitting, i.e., the various depths to which the shoulders 88 are cut, and also for the absence of an alignment lug such as the lug 90, is substantially identical to the key 12 and, therefore, in order to avoid needless repetition of description, similar reference numerals but of a higher order have been applied to the corresponding parts as between the disclosures of FIGS. 6 and 5.

Figure 1:
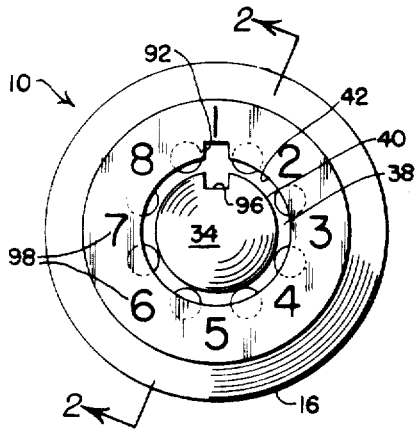
FIG. 1 is a front elevational view of an axial pin tumbler lock assembly embodying the principles of the present invention.
Figure 7:
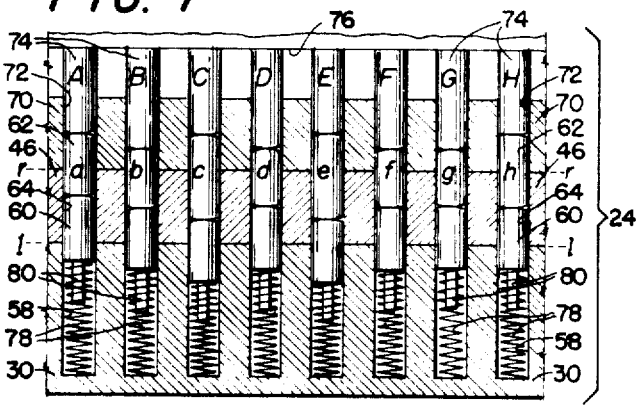
FIG. 7 is a schematic developed homolographic projection of the lock barrel, showing the split pin tumblers in the positions which they assume when the lock assembly is in its locked condition by reason of a prevailing initial pin tumbler combination.

The operation of the present lock assembly 10 may best be set forth by reference to the homolographic views of FIGS. 7 to 12, inclusive. In FIG. 7, the three-piece split pin tumbler arrangement represents the condition of the cylinder arrangement 24 when a first established tumbler combination prevails and the lock assembly is in its locked condition with no key in the lock. In order to facilitate a description of the manner in which various tumbler movements take place under the control of either the regular key 12 or the special reset key 13, the reset tumblers 74 are labelled A, B, C, D, E, F, G and H in FIG. 7 while the driver tumblers 62 are labelled a, b, c, d, e, f, g and h. This same labelling is preserved throughout all of FIGS. 7 to 12. Furthermore, since these figures of the drawings are homolographic views rather than structural views, further simplification of the discussion may be obtained by referring to the reset cylinder 70 as the "upper fill," the intermediate cylindrical section 46 of the lock shaft 34 as the "intermediate fill," and the fixed lock cylinder proper 30 as the "lower fill," the term "fill" being a conventional term which has arisen and is currently used in the lock industry to designate one of the tumbler-carrying strata of a composite lock cylinder regardless of whether the same be associated with an axial tumbler-type lock or any other tumbler lock.

Returning to a consideration of FIG. 7 of the drawings, it will be observed that several tumblers project across the interfacial planes r—r and l—l so that no relative movement of the three parts of the lock cylinder arrangement is possible and the lock assembly 10 remains in its locked condition.

In FIG. 8 the various tumblers assume the positions to which they are shifted when the proper operating key 12 is introduced into the lock assembly, the shoulders 88 on the key being cut so that each three-piece pin tumbler arrangement presents a split which lies in the interfacial plane l—l. However, one or more tumblers project across the interfacial plane r—r so that no relative turning movement between the upper reset fill and the intermediate fill is possible. The two uppermost fills, however, may turn bodily as a unit with respect to the lower fill for locking and unlocking operations. In FIG. 8 the operating key 12 is shown as being introduced into the lock assembly but not as yet turned. The net result is that the intermediate and lower fills are released from each other so that turning of the key will result in causing the lock assembly 10 to be unlocked.

In FIG. 9 a condition is illustrated wherein the special reset key 13 has been introduced into the lock assembly 10 but has not yet been turned for a reset operation. The upper fill and the intermediate fill are thus released from each other while the intermediate fill and the lower fill remain coupled to each other by reason of one or more tumblers projecting across the interfacial plane l—l. The various shoulders 188 on the reset key have thus pushed the three-piece pin tumbler arrangements inwardly in order to bring the splits between the reset tumblers 74 and the driver tumblers 62 into register with the upper and intermediate fills.

In FIG. 10 of the drawings, a condition is illustrated where the reset key 13 has been turned one increment of step so that the upper fill has rotated throughout a small angle in order to bring the reset tumbler A (one of eight) into register with the driver tumbler b (also one of eight), the reset tumbler B into register with the driver tumbler c, the reset tumbler C with the driver tumbler d, and so on, the reset tumbler H finally registering with the driver tumbler a.

Upon withdrawal of the special reset key 13, the various tumblers assume the positions wherein they are shown in FIG. 11, the compression springs 78 having forced the various three-piece pin tumbler arrangements forwards unitl all of the reset tumblers 74 have moved into engagement with the annular stop shoulder 76 which, as previously mentioned, is established by the inwardly rim flange 44 at the front end of the lock barrel 14 of the lock assembly 10. Said lock assembly has at this time been reset to a different combination so that the original key 12 is no longer capable of operating the lock assembly by reason of the fact that the various reset tumblers 74 are mated with different driver tumblers 62, each reset tumbler constituting, in effect, an extension of its associated driver tumbler and giving a new length value with respect to the latter.

Since the combination of the lock assembly 10 has thus been changed by the aforementioned manipulations of the reset key 13, a different key is now required in order to effect locking and unlocking of the lock assembly, Although such a key has not been illustrated herein, it will be understood that the key will have its tumbler-engaging shoulders cut so that when the key is introduced into the circular key-receiving opening 42 of the lock assembly, the mating reset tumblers 74 and driver tumblers 62 which are variously disposed in the upper and intermediate fills will be depressed to bring the splits which exist between the follower tumblers 60 and the driver tumblers 62 into the interfacial plane l—l, thus releasing the intermidate fill from the lower fill to the end that turning of the new key will effect lock unlocking and locking operations.

It will be understood that although only one specific reset operation has been illustrated and described herein, various other reset operations of a different character are available by further turning of the reset key 13. For example, if desired, a different pin tumbler combination will be attained if the reset key is turned to bring the reset tumbler A into register with the driver tumbler C, in which case the reset tumbler B will move into register with the driver tumbler d, and so on.

It is obvious that because the reset key 13 is devoid of an alignment lub such as the lug 90, the same is capable of being inserted into the lock assembly in any selected angular position. It is also capable of being withdrawn from the lock assembly in any desired angular position. However, unless such reset key 13 is introduced into the lock assembly 10 in the same angular position which it assumed at the time it was last withdrawn from the lock assembly, it cannot be turned for resetting operations inasmuch as the shoulders 188 which are provided thereon must cooperate with the reset tumblers 74 in such a manner as to depress such tumblers to positions wherein their inner ends lie in the interfacial plane r—r in order thus to release the upper fill from the intermediate fill. Therefore, in order to facilitate proper introduction of the special reset key 13 into the lock assembly 10, the front end face vided with numerical or other indicia such as are illustrated of the barrel 14, i.e., the front rim thereof, may be pro- in FIG. 1 and designated by the reference numeral 98.

The invention is not to be limited to the exact arrangement of parts shown in the accompanying drawings or described in this specification since various changes in the details of construction may be resorted to without departing from the spirit or scope of the invention. Therefore, only insofar as the invention is particularly pointed out in the accompanying claims is the same to be limited.

Having thus described the invention what I claim as new and desire to secure by Letters Patent is:

1. An axial pin tumbler lock comprising, in combination, a generally cylindrical open-ended tubular lock barrel having at its front end a fixed inturned rim flange defining a front central and circular key opening, a rigid, functionally one-piece lock shaft projecting centrally and axially through said lock barrel and embodying a front cylindrical section which projects forwardly and terminates in the vicinity of said central key opening and constitutes a centerpost for selective reception thereover of a tubular reset key and a tubular operating key, a rear cylindrical section which terminates adjacent to the rear end of the barrel [and embodies means between it and said rear end of the barrel to prevent forward axial displacement of the lock shaft with respect to said barrel], and an intermediate cylindrical section in the form of a radial lock shaft flange the diameter of which is greater than the diameter of either the front or rear cylindrical section and is also equal to the internal diameter of the lock barrel, *means operative normally to prevent axial displacement of the lock shaft with respect to the barrel,* locking means operatively connected to said rear cylindrical section of the lock shaft exteriorly of the lock barrel, a non-rotatable cylindrical rear tubular lock cylinder encompassing said rear cylindrical section of the lock shaft within the barrel and fixedly secured to the latter, a rotatable cylindrical front tubular reset cylinder disposed within the front portion of the barrel and encompassing said centerpost and through which the latter projects axially and beyond which it projects forwardly, said rotatable front reset cylinder, rotatable intermediate radial lock shaft flange and non-rotatable rear lock cylinder being provided with circumferentially spaced longitudinally extending bores which are movable into and out of alignment with one another upon relative angular shifting movement therebetween, follower tumblers, driver tumblers and reset tumblers slidable in the bores in said non-rotatable rear lock cylinder, lock shaft flange, and front reset cylinder respectively, provided with spring means for urging them forwards, and normally projecting across the interfacial planes between said flange and cylinders and preventing relative rotation between the radial lock shaft flange and each cylinder, certain of said driver tumblers being of different length and certain of said reset tumblers being of different length, said front reset cylinder, except only for the provision of said reset tumblers, being freely rotatable on said centerpost throughout an arc of 360°, the front ends of said reset tumblers being partially overhung by said fixed inturned flange, said driver tumblers and follower tumblers being effective when meeting on the interfacial plane between the radial lock shaft flange and the non-rotatable rear lock cylinder to release the lock shaft flange from said rear lock cylinder for rotation of the lock shaft as a whole and also its associated locking means, said reset and driver tumblers being effective when meeting on the interfacial plane between the lock shaft flange and front reset cylinder to release the latter from the former for rotation relatively thereto, a reset key having a tubular body telescopically receivable over said centerpost forwardly of the reset cylinder and having bitting embodying shoulders which are engageable with said reset tumblers and effecive to shift said reset and driver tumblers to their positions of reset cylinder release, and a plurality of similar operating keys, each of which has bitting different from the other operating keys and also from that of the reset key and embodies shoulders engageable with the reset tumblers and effective through said reset tumblers to shift the driver and follower tumblers to their positions of lock shaft flange release, depending upon the releative angular positions assumed by said reset cylinder and lock shaft flange.

2. An axial pin tumbler lock as set forth in claim 1 and wherein said inturned rim flange on the lock barrel is formed with an alignment notch therethrough, each operating key is provided on its body with an outwardly extending alignment lug designed to register with the alignment notch in order to insure proper cooperation between the key shoulders and reset tumblers at the time such operating key is inserted into said forward central key opening and adapted after full insertion of the operating key into place and in connection with turning of such key to swing around the inner surface of said inturned rim flange, and the body portion of the reset key is devoid of any alignment lug whereby the shoulders on its body portion may variously cooperate with said reset tumblers at time such [recess] *reset* key is inserted into said forward central key opening and said reset key may be withdrawn from said forward central key opening after turning thereof into any selected angular position.

3. An axial pin tumbler lock comprising, in combination, a generally cylindrical open-ended tubular lock barrel having at [is] *its* front end a fixed inturned rim flange defining a front central and circular key opening, a centerpost of circular cross section extending centrally and axially through the front end portion of the lock barrel, terminating in the vicinity of said central key opening and adapted for selective reception thereover of a tubular reset key and a tubular operating key, a rigid functionally one-piece lock shaft projecting centrally and axially through the intermediate and rear end portions of said lock barrel and embodying a rear cylindrical section which terminates adjacent to the rear end portion of the barrel [and embodies means between it and said rear end portion of the barrel to prevent forward displacement of the lock shaft with respect to said barrel], and a radial lock shaft flange which is disposed between the centerpost and the rear cylindrical section and the diameter of which is greater than the diameter of the centerpost and said rear cylindrical section and is equal to the internal diameter of the lock barrel, *means operative normally to prevent axial displacement of the lock shaft with respect to the barrel,* locking means operatively connected to said rear cylindrical section of the lock shaft exteriorly of the lock barrel, a non-rotatable cylindrical rear tubular lock cylinder encompassing said rear cylindrical section of the lock shaft within the barrel and fixedly secured to the latter, a rotatable cylindrical front tubular reset cylinder disposed within the front portion of the barrel and encompassing said centerpost and through which the latter projects axially and beyond which it projects forwardly, said rotatable front reset cylinder, rotatable intermediate radial lock shaft flange and non-rotatable rear lock cylinder being provided with circumferentially spaced longitudinally extending bores which are movable into and out of alignment with one another upon relative angular shifting movement therebetween, follower tumblers, driver tumblers and reset tumblers slidable in the bores in said non-rotatable rear lock cylinder, lock shaft flange, and front reset cylinder respectively, forming three-part only tumbler arrangements, provided with spring means for urging them forwards, and normally projecting across the interfacial planes between said flange and cylinders and preventing relative rotation between the radial lock shaft flange and each cylinder, certain of said driver tumblers being of different length and certain of said reset tumblers being of different length, said front reset cylinder, except only for the provision of said reset tumblers, being freely rotatable throughout an arc of 360°, the front ends of said reset tumblers being partially overhung by said fixed inturned flange, said driver tumblers and follower tumblers being effective when meeting on the interfacial plane between the radial lock shaft flange and the non-rotatable rear lock cylinder to release the lock shaft flange from said rear lock cylinder for rotation of the lock shaft as a whole and also its associated locking means, said reset and driver tumblers being effective when meeting on the interfacial plane between the lock shaft flange and front reset cylinder to release the latter from the former for rotation relatively thereto, a reset key having a tubular body telescopically receivable over said centerpost forwardly of the reset cylinder and having bitting embodying shoulders which are engageable with said reset tumblers and effective to shift said reset and driver tumblers to their positions of reset cylinder release, and a plurality of similar operating keys, each of which has bitting different from the other operating keys and embodies shoulders engageable with the reset tumblers and effective through said reset tumblers to shift he driver and follower tumblers to their positions of lock shaft flange release, depending upon the relative angular positions assumed by said reset cylinder and lock shaft flange.

References Cited

The following references, cited by the Examiner, are of record in the patented file of this patent or the original patent.

UNITED STATES PATENTS

| | | | |
|---|---|---|---|
| 3,411,331 | 11/1968 | Schlage | 70—363 |
| 3,320,783 | 5/1967 | Kerr | 70—363 X |
| 3,422,646 | 1/1969 | Monahan | 70—383 X |

ROBERT L. WOLFE, Primary Examiner

U.S. Cl. X.R.

70—382